(12) United States Patent
Yuan

(10) Patent No.: US 7,359,164 B2
(45) Date of Patent: Apr. 15, 2008

(54) SUPERCONDUCTING MATRIX FAULT CURRENT LIMITER WITH CURRENT-DRIVEN TRIGGER MECHANISM

(75) Inventor: Xing Yuan, Albany, NY (US)

(73) Assignee: Super Power, Inc

(*) Notice: Subject to any disclaimer, the term of this patent is extended or adjusted under 35 U.S.C. 154(b) by 669 days.

(21) Appl. No.: 10/877,838

(22) Filed: Jun. 25, 2004

(65) Prior Publication Data

US 2005/0047033 A1    Mar. 3, 2005

Related U.S. Application Data

(63) Continuation-in-part of application No. 10/609,969, filed on Jun. 30, 2003, now Pat. No. 6,958,893.

(51) Int. Cl.
| | |
|---|---|
| H02H 7/00 | (2006.01) |
| H02H 9/00 | (2006.01) |
| H01F 1/00 | (2006.01) |
| H01F 6/00 | (2006.01) |
| H01F 7/00 | (2006.01) |

(52) U.S. Cl. ................... 361/19; 335/216; 361/58

(58) Field of Classification Search ........... 361/19, 361/58; 335/226
See application file for complete search history.

(56) References Cited

U.S. PATENT DOCUMENTS

| | | | |
|---|---|---|---|
| 6,664,875 B2 | 12/2003 | Yuan | |
| 6,958,893 B2 * | 10/2005 | Yuan | ........... 361/19 |
| 2002/0018327 A1 | 2/2002 | Walker | |

* cited by examiner

Primary Examiner—Michael Sherry
Assistant Examiner—Dharti H Patel
(74) Attorney, Agent, or Firm—George L. Rideout, Jr.

(57) ABSTRACT

A modular and scalable Matrix-type Fault Current Limiter (MFCL) that functions as a "variable impedance" device in an electric power network, using components made of superconducting and non-superconducting electrically conductive materials. An inductor is connected in series with the trigger superconductor in the trigger matrix and physically surrounds the superconductor. The current surge during a fault will generate a trigger magnetic field in the series inductor to cause fast and uniform quenching of the trigger superconductor to significantly reduce burnout risk due to superconductor material non-uniformity.

9 Claims, 9 Drawing Sheets

SUPERCONDUCTING MATRIX FAULT CURRENT LIMITER WITH CURRENT-DRIVEN TRIGGER MECHANISM

This Continuation-In-Part application claims the benefit of prior non-provisional application Ser. No. 10/609,969, filed on Jun. 30, 2003 now U.S. Pat. No. 6,958,893, having at least one common inventor, in accordance with 35 U.S.C. 120.

The U.S. government has a paid-up license in this invention and the right in limited circumstances to require the patent owner to license others on reasonable terms as provided for my the terms of Contract No. DE-FC36-03G013033 awarded by the Department of Energy.

BACKGROUND

This invention relates generally to a current limiting device for use in electric power transmission and distribution systems and more particularly to an apparatus for triggering superconductors in a superconducting matrix fault current limiter.

In an existing superconducting matrix fault current limiter (MFCL) configuration (U.S. Pat. No. 6,664,875, assigned to the assignee of the present invention), a trigger matrix is connected in series with a current limiting matrix. The trigger matrix elements are used to provide necessary trigger magnetic fields to assist the transition from a superconducting state to a normal resistive state (the so-called "quenching" of a superconductor), of superconductor elements in the current limiting matrix. Using the first trigger matrix element (reference 310-1 in the patent) as an example, the magnetic fields are generated through current sharing between the superconductor trigger element $RR_1$ and its parallel-connected trigger coils $LL_{11}$ through $LL_{m1}$. Since $LL_{11}$ through $LL_{m1}$ are physically wound around corresponding individual superconductor element $R_{11}$ through $R_{m1}$ in the current limiting matrix, the magnetic field generated by the current in the trigger coils will cause $R_{11}$ through $R_{m1}$ to quench. In this configuration, the development of current sharing in the trigger matrix is highly dependent on the timely and effective quenching of the superconductor trigger element $RR_1$ during the initial rise of the fault current. Once the superconductor trigger element $RR_1$ starts to quench after the fault current surges past its critical current level, a voltage develops across the element itself. This voltage then drives part of the surge current to the trigger coils to create a current-sharing regime.

In the MFCL, a parallel inductor coil $LL_1$ is physically wound around $RR_1$. The current in this coil after the current sharing develops will generate a magnetic field to assist further quenching of $RR_1$. However, the initial quench of the $RR_1$ relies solely on the fault current surging past its critical current level. Therefore, the trigger superconductor elements themselves need to be very reliable in order for the whole MFCL concept to work. These trigger elements should have no or minimal non-uniformity throughout the superconductor volume. The non-uniformity within the superconductor could causes hot spots generated due to uneven quenching and potentially damage the material. It is therefore desirable to have a mechanism, within the MFCL to drive the trigger superconductors to quench uniformly at its initial phase during current limiting, to ensure the successful development of trigger voltage across the trigger matrix and current sharing in the trigger coils.

BRIEF DESCRIPTION

Briefly, in accordance with one embodiment of the present invention, a superconducting matrix fault current limiter (MFCL) is provided which has a trigger matrix section connected in series with a current limiting matrix section, the trigger matrix section has at least one trigger matrix element. Multiple trigger matrix elements can be connected in parallel within a trigger matrix. Each trigger element has at least one non-inductively arranged superconducting component. The superconducting component, herein referred to as trigger superconductor, is electrically connected in series with an inductor made of electrically conductive material to form a superconducting trigger mechanism. The series inductor is physically disposed around the trigger superconductor in such a way so that the magnetic field generated by the current in the series inductor will be uniformly applied to the trigger superconductor. Under the normal operation condition, the magnetic field generated by the steady current is small enough so that it will not seriously degrade the critical current level of the trigger superconductor. Once there is a fault, the current surge will immediately generate a sufficiently large magnetic field to quench the trigger superconductor. This triggering will happen before or near the start of the quenching process therefore ensuring the trigger superconductor will quench under an uniformed magnetic field with sufficient strength. Such a scheme overcomes non-uniformity existing within the superconductor so that the entire volume of the trigger superconductor will quench simultaneously and uniformly, therefore ensuring the timely development of the current sharing regime. The superconducting trigger mechanism is connected in parallel with a plurality of inductors made of electrically conductive material. These parallel inductors are used to generate adequate magnetic fields once the current sharing develops to trigger superconducting elements in the current limiting matrix.

In an alternative embodiment of the present invention, the superconducting trigger mechanism of the trigger matrix element in a trigger matrix has another component in addition to the trigger superconductor and its series inductor. This additional component is electrically connected in parallel with the trigger superconductor, is made of electrically conductive material and may be an inductor. Such an inductor functions as a shunt of the trigger superconductor. After the trigger superconductor fully quenches, part of its current can be diverted away into the shunt, therefore protecting the superconductor from prolonged heating so that it recovers faster to the superconducting state after current limiting.

The modular nature of the trigger matrix and current limiting matrix arrangement of the MFCL makes it extremely adaptable to high voltage and/or high current operating requirement of the power system to which it connects. For high voltage applications, the one-trigger-matrix-in-series-with-one-current-limiting-matrix becomes one basic building block for an MFCL. Multiple building blocks can be connected in series to form an MFCL that can effectively divide the higher voltage across the terminals into multiple lower-voltage blocks. Such an approach substantially simplifies the dielectric design of an MFCL to meet various high voltage insulation requirements. For high current applications, the basic building blocks are connected in parallel to meet the high current operating requirements. Furthermore, series and parallel connections of these building blocks are be utilized to address applications that have both high voltage and high current operating requirements.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
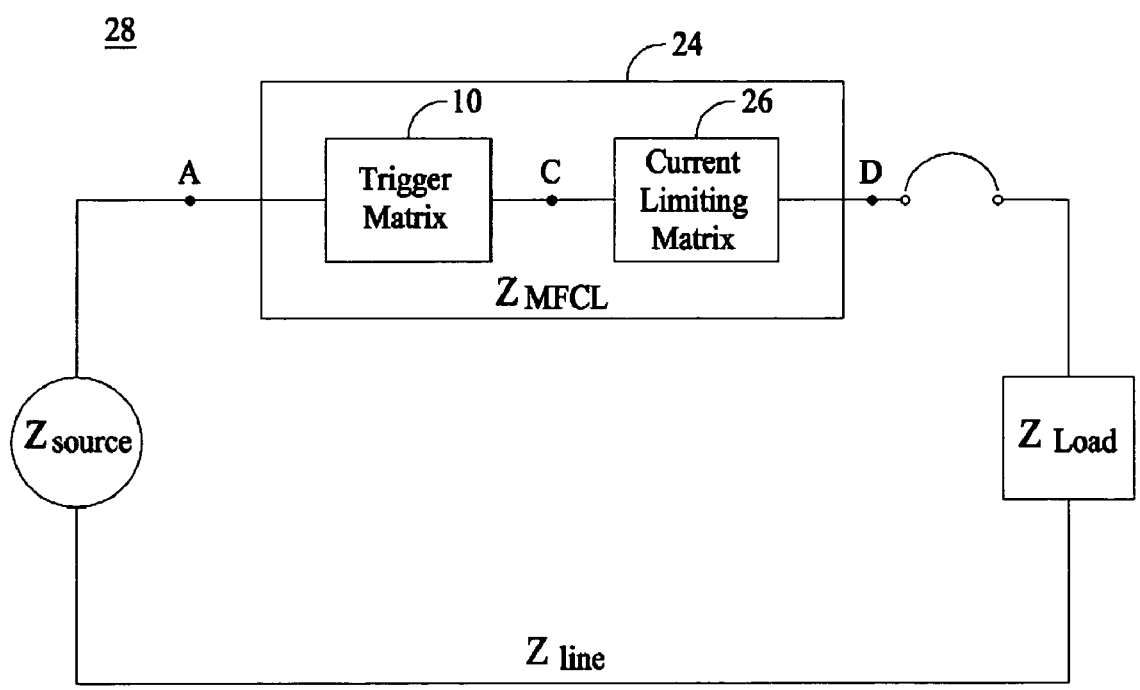
FIG. 1 is an illustration of the present invention in an AC circuit that is representative of a single-phase electric power system in its simplest form.

FIG. 1 shows an AC circuit 28 that is representative of a single-phase electric power system in its most general form. The AC circuit 28 includes an AC source that is a single-phase power source in a three-phased electricity transmission or distribution network with associated impedance $Z_{Source}$ and overall line impedance $Z_{Line}$. The AC source supplies a load that has associated impedance $Z_{Load}$. Electrically connected in series between the AC source and the load is an MFCL 24 device having associated impedance $Z_{MFCL}$ when a fault condition occurs, and a conventional circuit breaker. Absent MFCL 24 in the AC circuit 28, the fault current level when the load is electrically shorted to ground is determined by $i_1 = V_{Source}/(Z_{Source}+Z_{Line})$. However, the inclusion of MFCL 24 in the AC circuit 28 limits the fault current level to a value $i_2 = V_{Source}/(Z_{Source}+Z_{Line}+Z_{MFCL})$. As long as $Z_{MFCL}$ is non-zero when the fault occurs, the $i_2$ level is lower than $i_1$, thus achieving the fault current limiting function. If $i_2$ is limited to within the designed fault current interrupting capability of the circuit breaker, the circuit breaker will be able to function normally, thereby providing protection to the electric power system and customer equipment.

Figure 2:
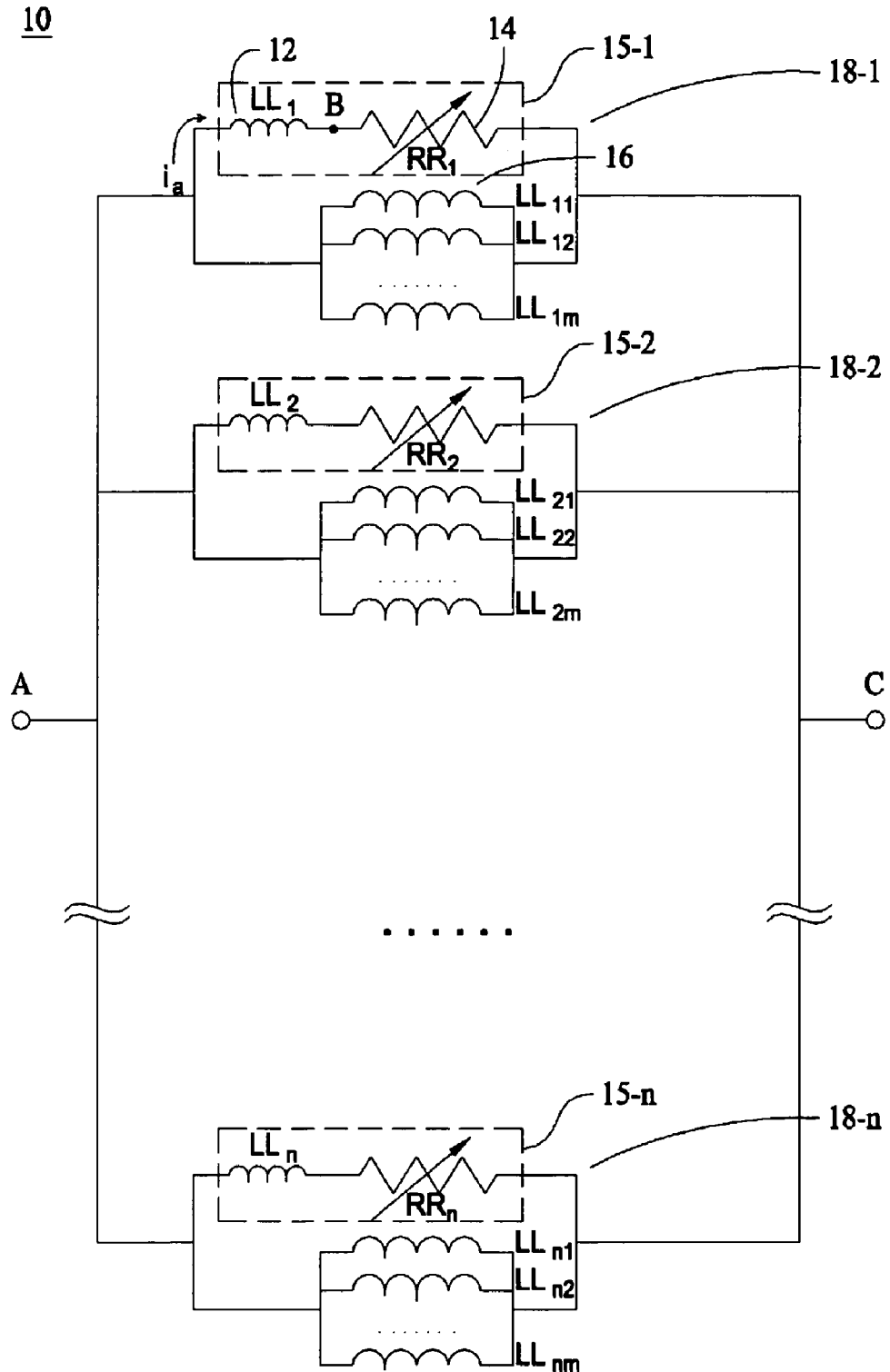
FIG. 2 is a schematic illustration of a trigger matrix of the present invention having an inductor connected in series with a trigger superconductor.

FIG. 2 shows a schematic diagram of a preferred embodiment of the trigger matrix 10 of the present invention, which includes a plurality of trigger matrix elements 18 (i.e., trigger matrix elements 18-1 through 18-n) electrically connected in parallel between nodes A and D of the MFCL 24 shown in FIG. 1. Each trigger matrix element 18 further includes a superconducting trigger mechanism 15, which comprises of a superconductor component RR 14 and a series inductor LL 12, arranged in parallel with m number of trigger inductors LL 16. For example, the trigger matrix element 18-1 includes a superconducting trigger mechanism 15-1 comprising a superconductor $RR_1$ arranged in series with a trigger inductor $LL_1$, connected in parallel with m number of trigger inductors $LL_{11}$ through $LL_{m1}$ (16-1). Likewise, the trigger matrix element 18-2 includes a superconducting trigger mechanism 15-2 comprising a superconductor $RR_2$ arranged in series with an inductor $LL_2$, connected in parallel with m number of trigger inductors $LL_{21}$ through $LL_{2m}$ (16-2). As a last example, the trigger matrix element 18-n includes a superconducting trigger mechanism 15-n including a superconductor $RR_n$ arranged in series with an inductor $LL_n$, connected in parallel with m number of trigger inductors $LL_{n1}$ through $LL_{nm}$ (16-n). Superconductor components may be selected from the group including rods, bars, plates, tape strips, tubes and bifilar coils, or other non or low-inductance configurations.

U.S. Pat. No. 6,664,875, assigned to the assignee of the present invention, herein incorporated by reference, describes the interconnection and physical arrangement of the trigger coils in a trigger matrix relative to the components in the current limiting matrix. Because the trigger coils LL 16 of the trigger matrix 10 of the present invention interacts in the same way as described in Publication '074, the details of the interaction of trigger matrix 10 and current limiter matrix 26 will not be described herein.

Figure 3:
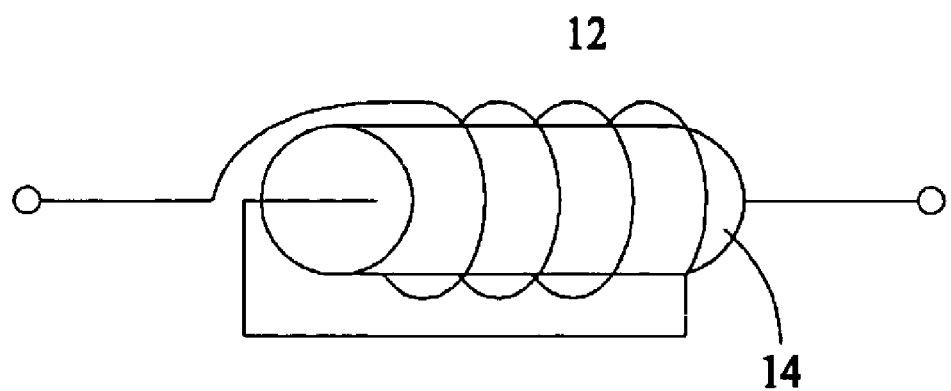
FIG. 3 is an illustration of the physical relationship between the series inductor and the trigger superconductor in a superconducting trigger mechanism within a trigger matrix element of the present invention shown in FIG. 2.
Figure 5:
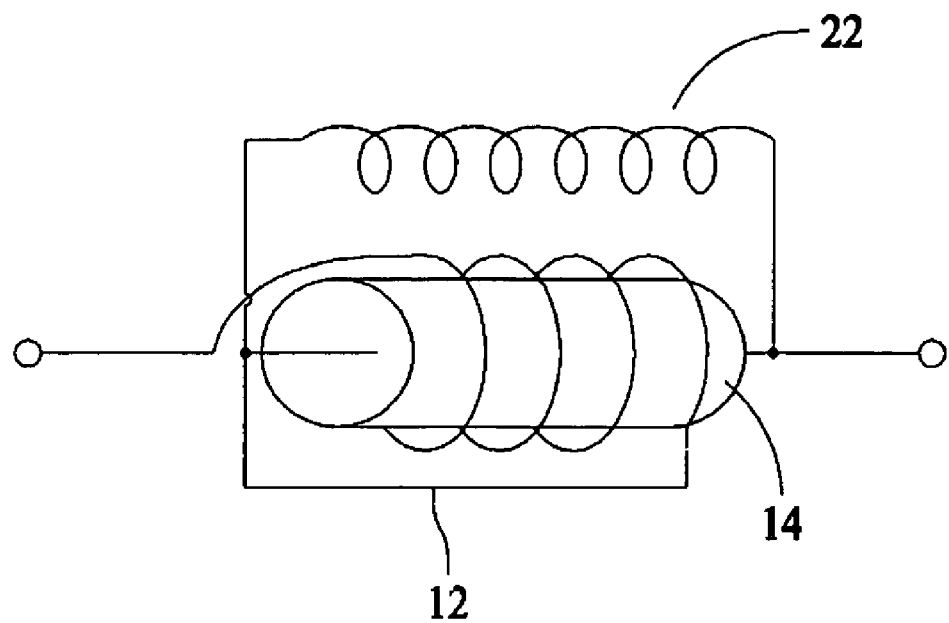
FIG. 5 is an example of the physical relationship between the components of a superconducting trigger mechanism of the embodiment of the present invention shown in FIG. 4.

FIG. 3 shows the physical arrangement of the superconducting trigger mechanism 15. The inductor LL 12 physically surrounds, is wound around and is electrically connected in series with the trigger superconductor RR 14. This physical relationship is repeated for each superconducting trigger mechanism 15 (15-1 through 15-n) in each of the trigger matrix element 18 (18-1 through 18-n) in the trigger matrix 10. The trigger superconductors 14 may assume the forms of a bar, a rod, a tube, a bifilar coil, or any other nonor low-inductive form. The series inductors 12 are made of electrically conductive materials, such as copper, and are selected from the group including helically wound solenoid coils or racetrack or saddle coils. The trigger superconductors 14, along with the rest of the MFCL device, can be housed in a cryostat (not shown). The superconductors are maintained at superconducting state by being cooled below their critical temperature with cooling provided either by coolant within the cryostat or by external cooling mechanisms such as cryocoolers or combination of both.

The operation of the trigger matrix 10 is now described. To achieve high degree of modularity and scalability of the MFCL components, the preferred embodiment assumes all trigger matrix elements 18 (18-1 through 18-n) are identical. This means that within the trigger matrix 10, as illustrated in FIG. 2, all trigger superconductors $RR_1$ through $RR_n$ are identical, all series inductors $LL_1$ through $LL_n$ are identical, and all trigger inductors $LL_{11}$ through $LL_{nm}$ are the same. (Within the current-limiting matrix 26, all superconducting components are assumed to be the same and all non-superconducting components are assumed to be the same.)

The combined critical current level of all the trigger superconductors RR in the trigger matrix 10 under the normal operating condition is designed to be no less than the peak of the nominal AC operating current plus any over-current capacity required by the power system. Each trigger matrix element 18 will see "1/n" of this total current. Within the superconducting trigger mechanism 15 of each trigger matrix element 18, using 15-1 of 18-1 as an example, the series inductor $LL_1$ is designed to have very low resistance and small inductance so its total impedance is substantially lower than that of the trigger inductors 16 parallel connected to the superconducting trigger mechanism 15. Therefore, of the total current seen by 18-1, only a minimal amount will be current-shared into the parallel trigger inductors 16-1. This minimal amount of current will generate some power losses in the trigger inductors 16. The current will also generate a magnetic field that will be exerted on the superconducting elements in the current-limiting matrix 26. However, the level of the magnetic field is very small compare to the critical field level of the superconductors, it will have negligible effect on the critical current level of the superconductors in the current-limiting matrix 26. The majority of the current seen by 18-1 will then pass the superconducting trigger mechanism 15-1. The trigger superconductor 14 exhibits no electrical resistance since the current is below its critical current level, and will show no voltage drop across the element since it is also in a non-inductive form. Since the series inductor 12 has very low impedance, so the overall voltage drop across the superconducting trigger mechanism 15-1 is so small as to have negligible impact to the power system to which the MFCL device is connected. The current passing through 18-1 and hence the series inductor 12 will generate a magnetic field in the inductor coil. Because the series inductor is physically disposed around the trigger superconductor 14 as illustrated in FIG. 3, such a magnetic field will degrade the critical current level of the trigger superconductor 14. However, as long as the now reduced critical current level of 14 is still higher than the normal operating current seen by 15-1, the operation of the trigger matrix 10 will not be affected.

When a fault occurs in the power system, the current seen by the superconducting trigger mechanism 15-1 increases to multiples of the normal operating current. Consequently, the magnetic field generated by this surge current in the series inductor 12 increases dramatically and significantly reduces the critical current level of the trigger superconductor 14 it encloses, causing the trigger superconductor 14 to immediately start to quench. Because the magnetic field generated in the series inductor 12 is designed to be uniform, the entire volume of the trigger superconductor 14 is now under a uniformed quench magnetic field, reducing any hot spot burnout risk due to non-uniformity existed within the superconducting material. At the same time when this trigger magnetic field develops, the surged current passing through the trigger superconductor 18 far exceeds the critical current level of the superconductor and drives it to transition from superconducting state to a resistive state. Once the initial quench starts, the subsequent $i^2r$ heating within the trigger superconductor 18 also contributes to the quenching process. Overall, all three factors, namely the current surge, the temperature rise, and the external magnetic field, all work to promote fast and uniform quenching of the trigger superconductor and to prevent its burnout due to material defects.

Once the trigger superconductor $RR_1$ starts to quench, a substantial voltage drop across the superconducting trigger mechanism 15-1 starts to develop. This voltage will drive to create a meaningful current-sharing regime between the 15-1 and the parallel trigger inductors $LL_{11}$ through $LL_{m1}$ (16-1). The shared-current in those trigger inductors 16-1 will then generate sufficient magnetic fields to trigger the superconducting elements in the current-limiting matrix 26. The parallelism of the trigger matrix elements 18-1 through 18-n within the trigger matrix 18 provides built in redundancy in the MFCL 24 design such that a failure of any individual trigger matrix element 18 does not result in the failure of the entire device.

Figure 4:
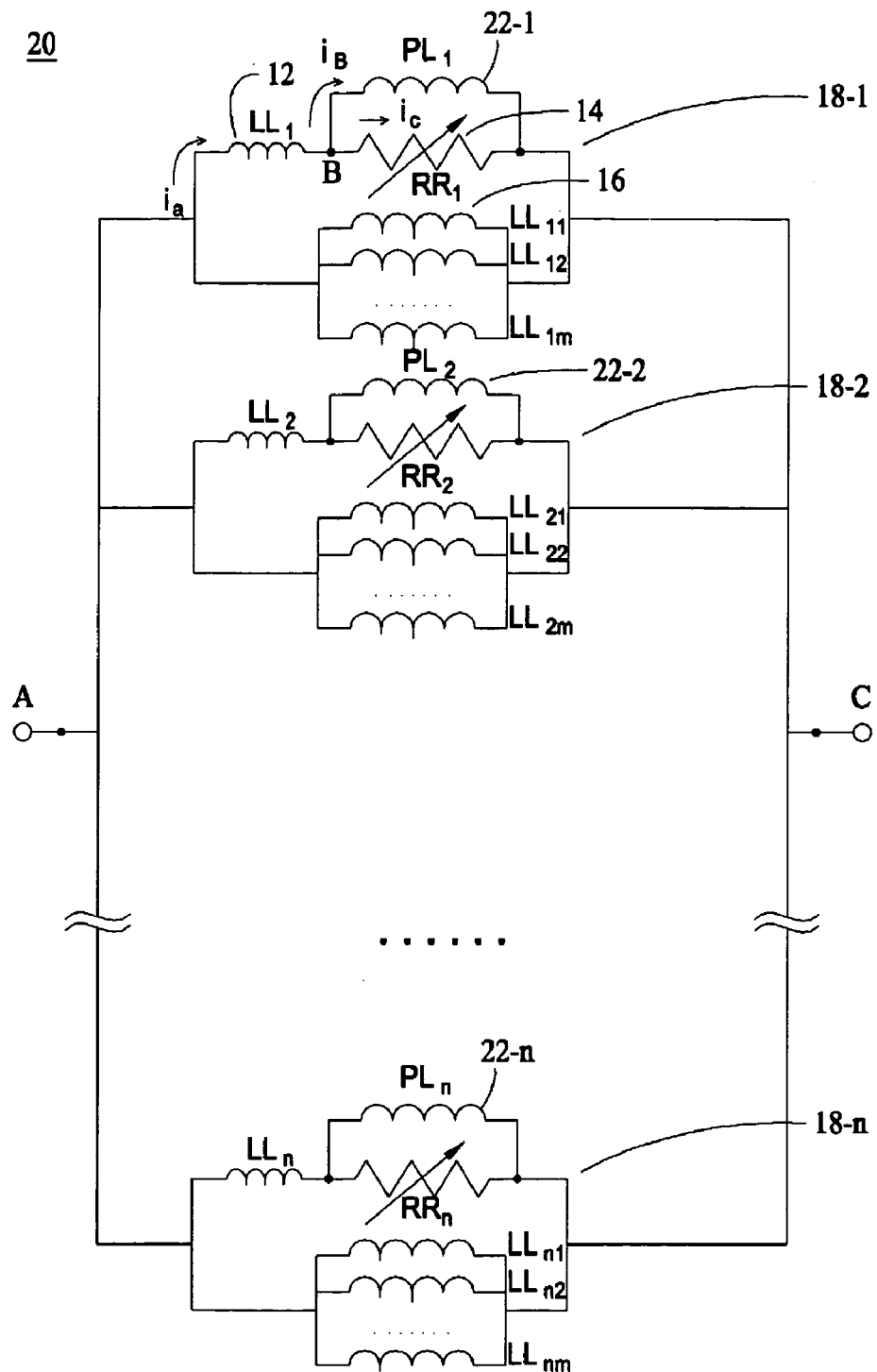
FIG. 4 is a schematic illustration of the component arrangement within a trigger matrix of another embodiment of present invention.

FIG. 4 is an illustration of an alternative embodiment of the present invention. The superconducting trigger mechanism 15 of the trigger matrix element 18 in a trigger matrix 10 has another component 22 in addition to the trigger superconductor 14 and its series inductor 12. This additional component 22 is electrically connected in parallel with the trigger superconductor 14, is made of electrically conductive material and may be an inductor. Such an inductor $PL_1$ 22 would function as a shunt of the trigger superconductor 14. After the trigger superconductor 14 fully quenches, part of its current can be diverted away into the shunt $PL_1$ 22. This diversion will protect the superconductor 14 from prolonged heating so that it can recover faster to its superconducting state after current limiting.

Figure 11:
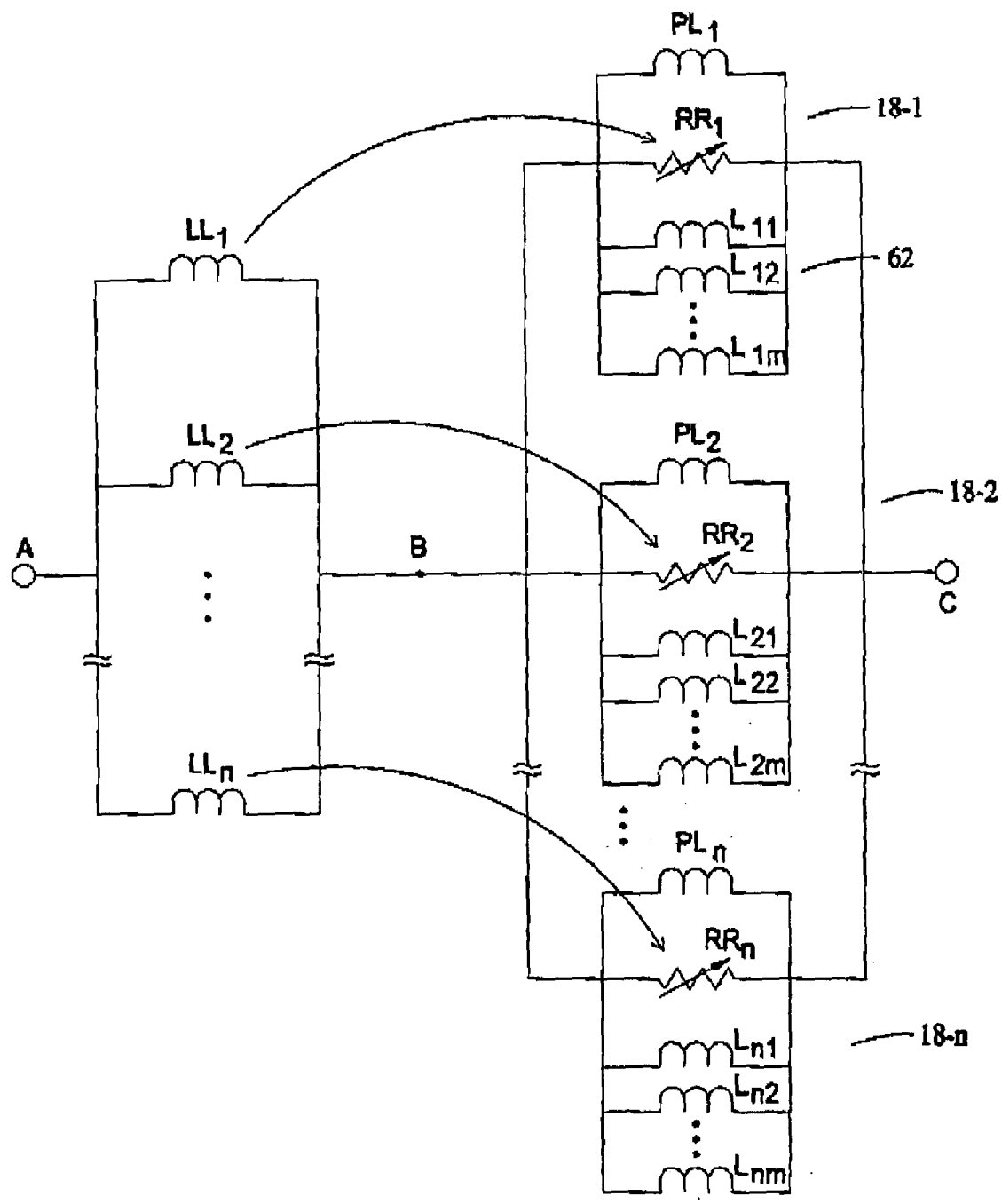
FIG. 11 is a schematic illustration of the component arrangement within a trigger matrix of another embodiment of present invention.

The trigger matrix embodiment illustrated in FIG. 11 operates in much the same manner as the MFCL described in FIG. 4, however, there are some differences. There are two inductor sections connected in series. The first inductor section has a number of inductors $LL_1$ through $LL_n$ that are electrically connected in parallel between nodes (A) and (B). In the second inductor section, a number of inductor groups are electrically connected in parallel between nodes (B) and (C). In one such inductor group, shunt inductor $PL_1$, and inductor $L_{11}$ to $L_{1m}$ and superconductor component $RR_1$ are all electrically connected in parallel. Inductor $LL_1$ is physically wrapped around superconductor $RR_1$ as depicted by the arrow between these two layouts, as shown in FIG. 11. This arrangement is identified as trigger matrix element 18-1. This electrical arrangement, which is not just a simple series or parallel relationship, is equivalent for each other trigger matrix element 18-2 through 18-n.

During normal operation system current (i) flows from node (A) to node (c) through respective inductors LL and superconductor RR. The normal operating current will be equally shared amongst inductor LLs, which generates a magnetic field inside the inductor coils. Since inductor LLs are physically wrapped around corresponding superconductors in 18-1 to 18-n, such a magnetic field will reduce the critical current level of the superconductors in the trigger matrix. It is very important that this reduced critical current level of the superconductors still exceed the minimum operating level of the overall MFCL device, that is the peak of the normal operating current of the system plus a desired over-current level based on the system requirement. When the trigger matrix in FIG. 11 is designed following this principle, then current sharing does not occur in inductors $PL_n$ and $L_{nm}$ during normal operation. As a result there is no magnetic field generated around superconductors in the current-limiting matrix 26. Therefore there will be no degradation in performance as described earlier for the configuration in FIG. 4. When a fault condition occurs, the voltage generated across superconductors RRs due to quenching will create current sharing and corresponding magnet field in inductors Ls, contributing to the quenching of superconductors in the current-limiting matrix 26. By using different values of shunt inductors PLs, the current sharing level amongst components connected in parallel between nodes B and C, as well as the overall impedance of this arrangement during fault limiting can be adjusted to a desired level. So these inductors can be used as "tuning" tools of the MFCL trigger matrix performance.

Figure 12:
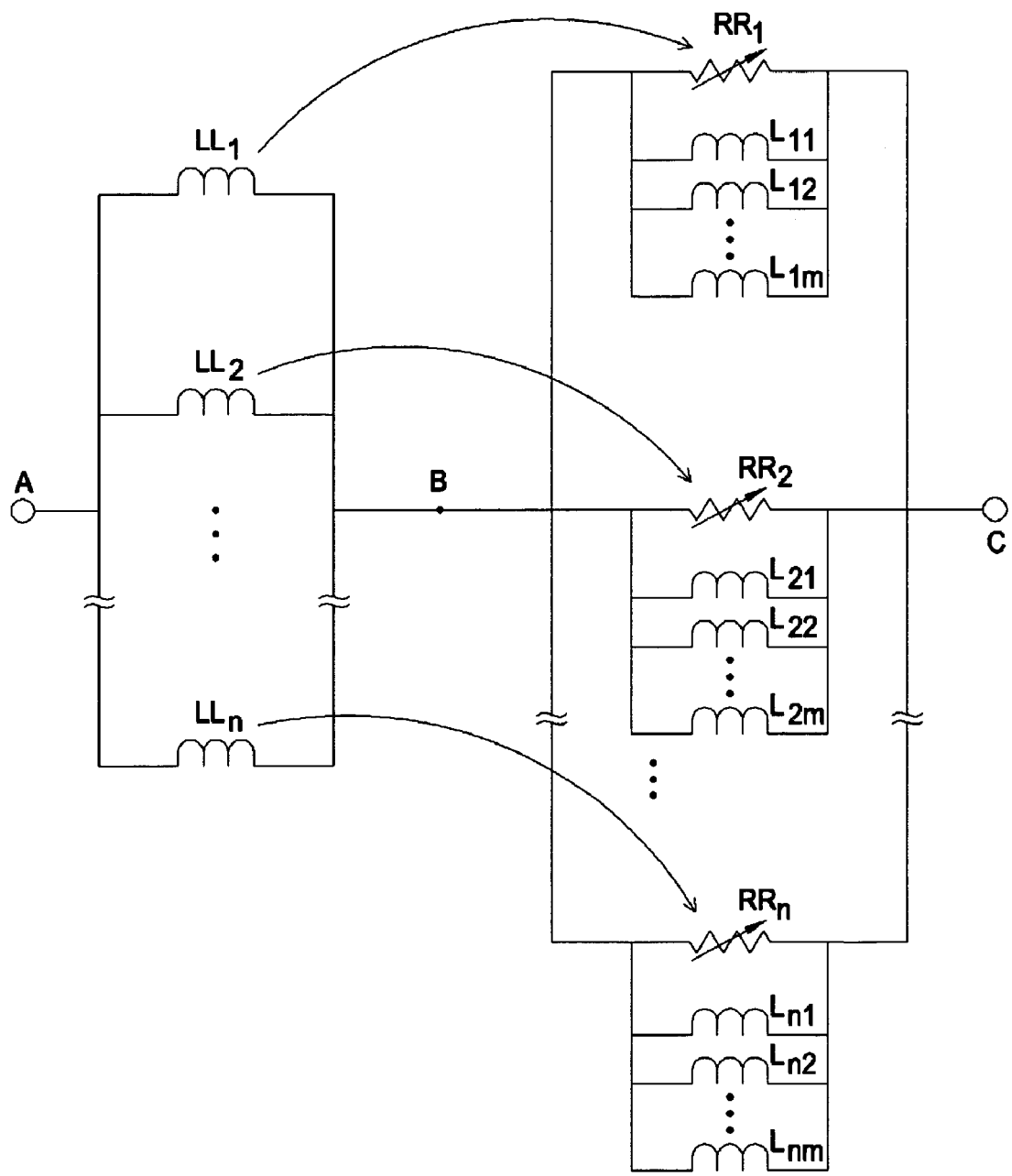
FIG. 12 is a schematic illustration of the component arrangement within a trigger matrix of another embodiment of present invention.

In an alternative embodiment, as illustrated in FIG. 12, shunt inductors $PL_1$ through $PL_n$ are not present. In all other respects this circuit operates like the trigger matrix in FIG. 11.

Figure 6:
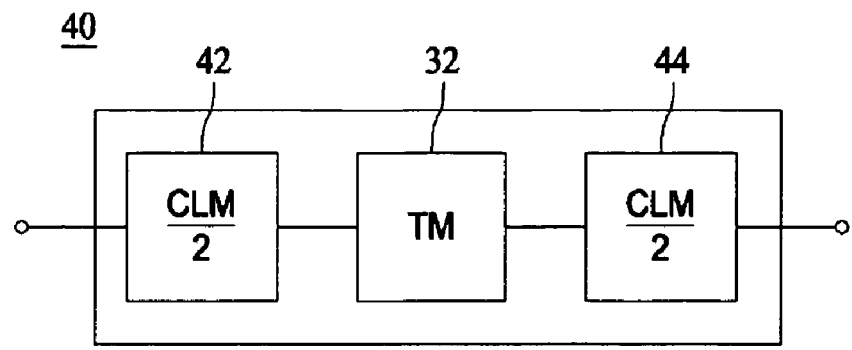
FIG. 6 is a block diagram of a split current-limiting matrix of the present invention.
Figure 7:
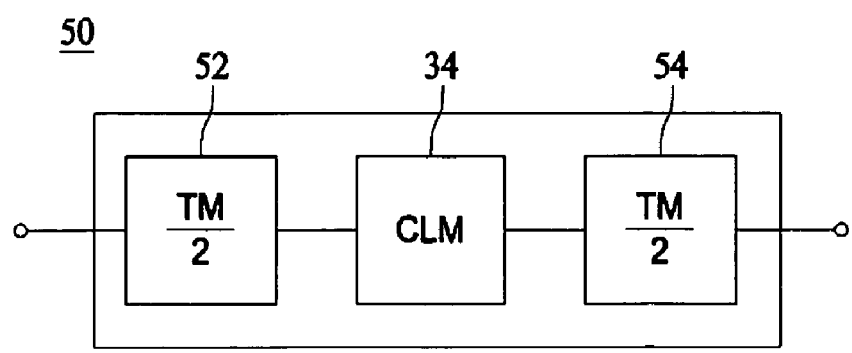
FIG. 7 is a block diagram of a spilt trigger matrix of the present invention.

There are wide-range power system applications for a current limiting device such as an MFCL, especially at the transmission voltage level (loosely defined as voltage at or higher than 100 kV line-to-line of a 3-phased system). The modular nature of the trigger matrix and current limiting matrix arrangement of the MFCL makes it well suited for high voltage applications. In addition, the relative placement of trigger matrix (TM) and current limiting matrix (CLM) can be arranged to address the high voltage insulation requirements. FIG. 6 shows one possible arrangement of the trigger matrix 32 and current limiting matrix (42+44) that effectively reduce the voltage insulation requirement within the MFCL device 40 by half. FIG. 7 shows another embodiment of the arrangement of trigger matrix (52+54) and current limiting matrix 34 that can effectively reduce the voltage insulation requirement within the MFCL 50 by half.

Figure 8:
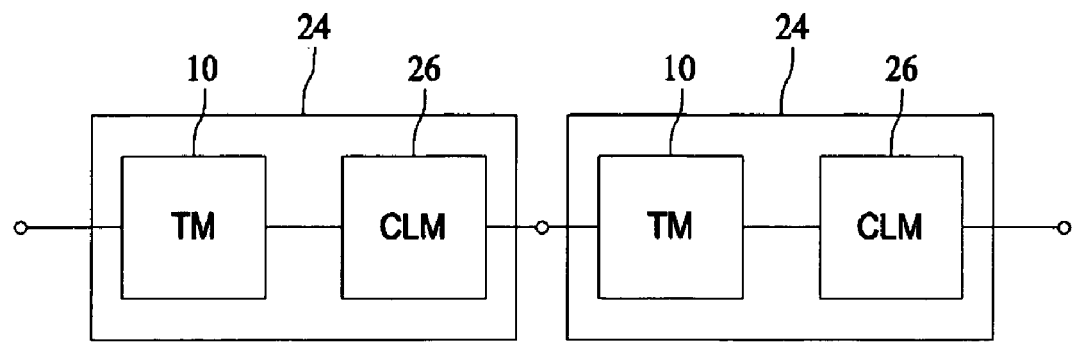
FIG. 8 is a block diagram of an alternative embodiment of the present invention where the modular trigger and current-limiting matrices of the present invention are arranged in series.

Furthermore, MFCL configurations 24 in FIG. 1, 40 in FIGS. 6 and 50 in FIG. 7 can be treated as one basic building block for a larger modular MFCL. Multiple such building blocks can be connected in series to form an MFCL that can effectively divide the higher voltage across from terminal to terminal into multiple lower-voltage blocks. Such an approach substantially simplifies the dielectric design of an MFCL to meet various high voltage insulation requirements. FIG. 8 shows one embodiment of using such an approach to form a larger modular MFCL, using trigger matrix 10 and current limiting matrix 26 in an MFCL 24 as an example.

Figure 9:
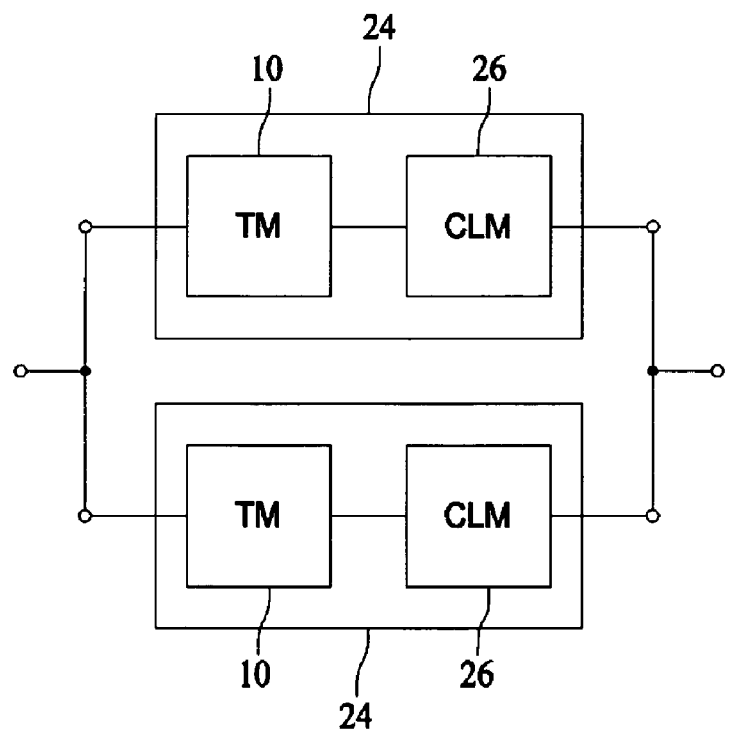
FIG. 9 is a block diagram of an alternative embodiment of the present invention where the modular trigger and current-limiting matrices of the present invention are arranged in parallel.

For high current applications, the aforementioned basic building blocks are connected in parallel to meet the high current operating requirements. FIG. 9 shows one embodiment of using such an approach. Again, it uses trigger matrix 10 and current limiting matrix 26 in an MFCL 24 as an example.

Figure 10:
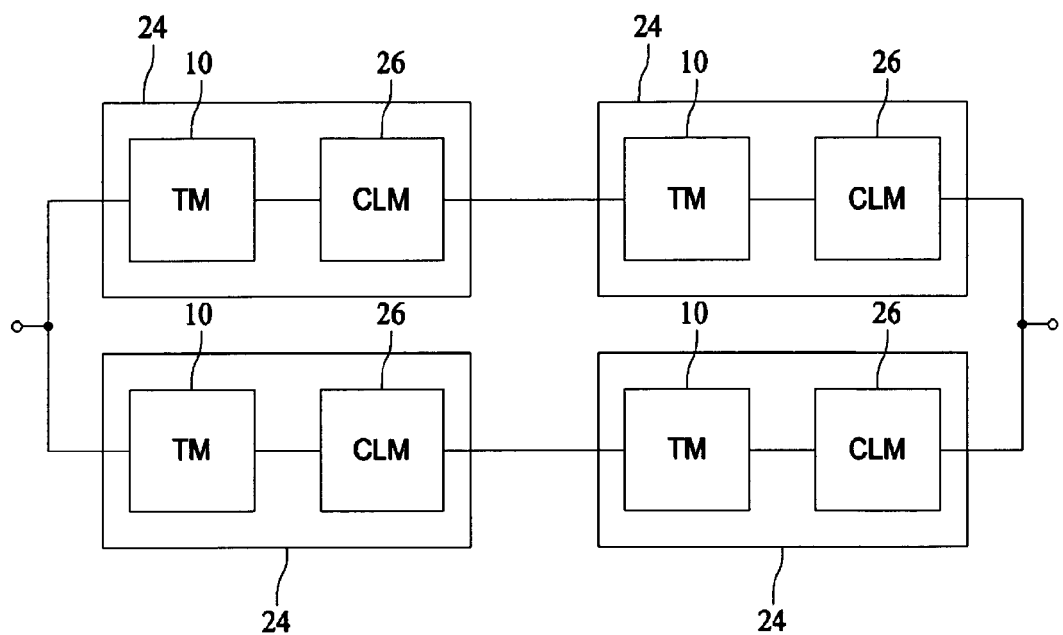
FIG. 10 is a block diagram of an alternative embodiment of the present invention where the modular trigger and current-limiting matrices of the present invention are arranged in series and then in parallel.

For applications that have both high voltage and high current operating requirements, series as well as parallel connections of these basic building blocks may be utilized. FIG. 10 shows one embodiment of using such an approach using trigger matrix 10 and current limiting matrix 26 in an MFCL 24 as an example.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A matrix-type superconducting fault current limiter having a current limiting matrix section, said fault current limiter comprising:
    a trigger matrix section connected in series with the current limiting matrix, said trigger matrix section comprising at least one first inductor section connected in series with a second inductor section;
    wherein said first inductor section in said trigger matrix section comprises at least two inductors connected in parallel with each other, said inductors are made of electrically conductive material;
    wherein said second inductor section in said trigger matrix section comprises at least one inductor group, said inductor group comprising plurality of inductors made of electrically conductive material connected in parallel with each other and with at least one superconductor component, wherein said second inductor section also comprises a plurality of said inductor groups electrically connected in parallel;
    wherein the number of said inductors in said first inductor section is the same as the number of said inductor groups in said second inductor section;
    wherein said inductor in said first inductor section is wrapped around the superconductor component of a corresponding inductor group in said second inductor section.

2. The fault current limiter as recited in claim 1, comprises superconductor components selected from the group including rods, bars, plates, tape strips, tubes, and bifilar coils.

3. The fault current limiter as recited in claim 1, wherein said superconductor component comprises a plurality of superconductor elements electrically connected in series.

4. The fault current limiter as recited in claim 1, wherein said superconductor component comprises a plurality of superconductor elements electrically connected in parallel.

5. The fault current limiter of claim 1, wherein at least two said trigger matrices are arranged in series with at least one said current limiting matrix.

6. The fault current limiter of claim 1, wherein at least one said trigger matrix is arranged in series with at least two said current limiting matrices.

7. The fault current limiter as recited in claim 1, wherein at least two said matrix fault current limiters are arranged in series.

8. The fault current limiter as recited in claim 1, wherein at least two said matrix fault current limiters are arranged in parallel.

9. The fault current limiter as recited in claim 2, wherein the inductive coils are coils made of electrically conductive materials selected from the group including helically-wound solenoid coils, racetrack coils and saddle coils.

* * * * *